United States Patent [19]

Walter et al.

[11] Patent Number: 4,994,563
[45] Date of Patent: Feb. 19, 1991

[54] MONOAZO DYES CONTAINING A 3-SULFOALKANOYLAMINO OR 3-SULFOALKYLSULFONYLAMINOANILINE COUPLING COMPONENT

[75] Inventors: Harald Walter; Rudolf Hurter, both of Basel, Switzerland

[73] Assignee: Ciba-Geigy Corporation, Ardsley, N.Y.

[21] Appl. No.: 372,402

[22] Filed: Jun. 27, 1989

[30] Foreign Application Priority Data

Jun. 29, 1988 [CH] Switzerland .................. 2471/88

[51] Int. Cl.⁵ .............. C09B 29/033; C09B 29/085; C09B 29/09; C09B 31/047; C09B 31/14
[52] U.S. Cl. ............................. 534/728; 534/573; 534/583; 534/630; 534/632; 534/643; 534/730; 534/752; 534/753; 534/775; 534/787; 534/788; 534/789; 534/795; 534/829; 534/845; 534/860
[58] Field of Search .............. 534/768, 701, 752, 845, 534/781, 783, 591, 592, 728, 753, 860, 829, 795, 789, 788, 787, 775, 643, 730, 630, 632

[56] References Cited

U.S. PATENT DOCUMENTS

| | | |
|---|---|---|
| 4,265,812 | 5/1981 | Weaver et al. ............. 534/768 |
| 4,282,144 | 8/1981 | Weaver et al. ............. 534/781 X |
| 4,301,068 | 11/1981 | Giles et al. ............. 534/768 X |
| 4,301,069 | 11/1981 | Weaver et al. ............. 534/753 X |
| 4,301,070 | 11/1981 | Giles et al. ............. 534/768 X |
| 4,301,071 | 11/1981 | Giles et al. ............. 534/752 |
| 4,302,387 | 11/1981 | Giles et al. ............. 534/768 |
| 4,302,390 | 11/1981 | Giles et al. ............. 534/768 X |
| 4,499,272 | 2/1985 | Hyatt et al. ............. 534/768 |

FOREIGN PATENT DOCUMENTS

| | | | |
|---|---|---|---|
| 0017558 | 10/1980 | European Pat. Off. | ............. 534/768 |
| 0020161 | 10/1980 | European Pat. Off. | ............. 534/768 |
| 2147603A | 5/1985 | United Kingdom | ............. 534/768 |

Primary Examiner—Floyd D. Higel
Attorney, Agent, or Firm—George R. Dohmann

[57] ABSTRACT

The azo dyes of the formula

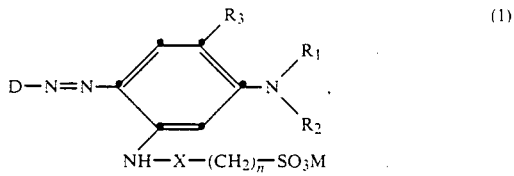

in which D is a diazo component, $R_1$ and $R_2$ independently of one another are each a $C_1$-$C_{10}$alkyl, $C_5$-$C_7$cycloalkyl, phenyl or naphthyl radical each of which is substituted or unsubstituted, or $R_1$ and $R_2$, together with the nitrogen atom linking them, are a 5-membered, 6-membered or 7-membered ring each of which is unsubstituted or substituted by heteroatoms, $R_3$ is hydrogen, halogen or a $C_1$-$C_{10}$alkyl, $C_1$-$C_{10}$alkoxy or phenoxy radical each of which is substituted or unsubstituted, X is —CO— or —$SO_2$—, n is the number 1, 2, 3, 4, 5 or 6 and M is a cation, produce dyeings of good fastness properties on fibre materials containing nitrogen or containing hydroxyl groups. This application also relates to the preparation and use of said azo dyes and to intermediates utilized in the preparation of said azo dyes.

7 Claims, No Drawings

MONOAZO DYES CONTAINING A 3-SULFOALKANOYLAMINO OR 3-SULFOALKYLSULFONYLAMINOANILINE COUPLING COMPONENT

The present invention relates to novel azo dyes, a process for their preparation and the use of these dyes for dyeing and printing fibre materials, in particular textile fibre materials.

The present invention relates to azo dyes of the formula

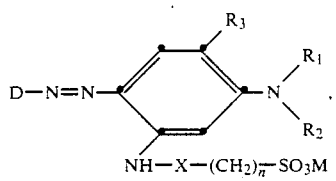

in which D is a diazo component, $R_1$ and $R_2$ independently of one another are each a $C_1$-$C_{10}$alkyl, $C_5$-$C_7$cycloalkyl, phenyl or naphthyl radical each of which is substituted or unsubstituted, or $R_1$ and $R_2$, together with the nitrogen atom linking them, are a 5-membered, 6-membered or 7-membered ring each of which is unsubstituted or substituted by heteroatoms, $R_3$ is hydrogen, halogen or a $C_1$-$C_{10}$alkyl, $C_1$-$C_{10}$alkoxy or phenoxy radical each of which is substituted or unsubstituted, X is —CO— or —$SO_2$—, n is the number 1, 2, 3, 4, 5 or 6, in particular the number 1 or 2, and M is a cation.

The radical D can contain the substituents customary in azo dyes, for example alkyl groups having 1 to 8, preferably 1 to 4, carbon atoms, for example methyl, ethyl, propyl, isopropyl, butyl, isobutyl, sec-butyl, tert-butyl, hexyl or octyl, alkoxy groups having 1 to 8 carbon atoms, in particular 1 to 4 carbon atoms, for example methoxy, ethoxy, propoxy, isopropoxy or butoxy, $C_2$-$C_8$alkanoyl, for example acetyl, propionyl, isopropionyl, butyryl or isobutyryl, acylamino groups, such as alkanoylamino groups having 2 to 8 carbon atoms and alkoxycarbonylamino groups having 2 to 8 carbon atoms, for example acetylamino, propionylamino, methoxycarbonylamino, ethoxycarbonylamino or benzoylamino, $C_5$-$C_7$cycloalkylcarbonyl, benzoyl which is unsubstituted or substituted by $C_1$-$C_4$alkyl and/or halogen, amino, monoalkylamino or dialkylamino each of which has 1 to 8 carbon atoms in the alkyl radical, phenylamino, alkoxycarbonyl having 1 to 8 carbon atoms in the alkoxy radical, $C_5$-$C_7$cycloalkylaminosulfonyl, nitro, cyano, trifluoromethyl, halogen, such as fluorine, bromine or especially chlorine, sulfamoyl, sulfamoyl which is monosubstituted or disubstituted on the nitrogen atom by $C_1$-$C_4$alkyl, $C_5$-$C_7$cycloalkyl or phenyl, carbamoyl, ureido, hydroxyl, $C_1$-$C_8$alkylsulfonyl, $C_1$-$C_8$alkylaminosulfonyl, phenylsulfonyl or phenoxysulfonyl each of which is unsubstituted or substituted by $C_1$-$C_4$alkyl and/or sulfo and/or halogen, carboxyl, sulfomethyl, sulfo, sulfato, thiosulfato, $C_1$-$C_8$alkylthio, for example methylthio, ethylthio, propylthio, isopropylthio, butylthio, isobutylthio, sec-butylthio, tert-butylthio, pentylthio, hexylthio or octylthio, benzisothiazolyl, benzthiazolyl, benzisooxazolyl or benzoxazolyl each of which is unsubstituted or substituted by $C_1$-$C_4$alkyl and/or halogen, for example fluorine, bromine or especially chlorine, arylazo groups, for example the phenylazo and naphthylazo group, and also phenyl or naphthyl, or phenoxy or phenylaminosulfonyl both of which are unsubstituted or substituted by $C_1$-$C_4$alkyl and/or halogen, it being possible for the phenyl or naphthyl radicals indicated to be further substituted by the substituents indicated above.

Examples of halogen suitable for $R_3$ in formula (1) are fluorine, bromine and especially chlorine.

Suitable examples of $C_1$-$C_{10}$alkyl for $R_1$, $R_2$ and $R_3$ in formula (1) are methyl, ethyl, propyl, isopropyl, butyl, isobutyl, sec-butyl, tert-butyl, pentyl, hexyl, octyl or decyl, and also the corresponding radicals which are substituted, for example, by hydroxyl, alkoxy having 1 to 4 carbon atoms, phenyl, sulfo, sulfato, thiosulfato, cyano or halogen, for example β-hydroxyethyl, β-methoxyethyl, β-chloroethyl, benzyl, β-sulfatoethyl or γ-methoxypropyl.

Suitable examples of $C_1$-$C_{10}$alkoxy for $R_3$ in formula (1) are methoxy, ethoxy, propoxy, isopropoxy, butoxy, isobutoxy, sec-butoxy, tert-butoxy, hexyloxy and octyloxy, and also the corresponding radicals which are substituted, for example, by alkoxy having 1 to 4 carbon atoms, for example β-methoxyethoxy or β-ethoxyethoxy.

A suitable phenoxy radical for $R_3$ in formula (1) is a phenoxy radical which is unsubstituted or substituted by $C_1$-$C_4$alkyl, such as methyl, ethyl, propyl, isopropyl, butyl, isobutyl, sec-butyl and tert-butyl, $C_1$-$C_4$alkoxy, such as methoxy, ethoxy, propoxy, isopropoxy, butoxy, isobutoxy, sec-butoxy and tert-butoxy, halogen, such as fluorine, chlorine and bromine, $C_2$-$C_4$alkanoylamino, such as acetylamino and propionylamino, benzoylamino and sulfo.

Suitable examples of $C_5$-$C_7$cycloalkyl for $R_1$ and $R_2$ in formula (1) are cyclopentyl, cyclohexyl and cycloheptyl and also the corresponding radicals which are substituted, for example, by halogen, such as fluorine, chlorine or bromine, $C_1$-$C_4$alkyl, such as methyl, ethyl, propyl, isopropyl, butyl, isobutyl, sec-butyl and tert-butyl, and $C_1$-$C_4$alkoxy, such as methoxy, ethoxy, propoxy, isopropoxy, butoxy, isobutoxy, sec-butoxy and tert-butoxy. The methylcyclohexyl radical may be mentioned as an example.

Substituted or unsubstituted phenyl or naphthyl which is suitable for $R_1$ and $R_2$ in formula (1) is, in addition to unsubstituted phenyl or naphthyl, radicals containing, for example, the following substituents: $C_1$-$C_4$alkyl, such as methyl, ethyl, propyl, isopropyl, butyl, isobutyl, sec-butyl and tert-butyl, $C_1$-$C_4$alkoxy, such as methoxy, ethoxy, propoxy, isopropoxy, butoxy, isobutoxy, sec-butoxy and tert-butoxy, halogen, such as fluorine, chlorine and bromine, $C_2$-$C_4$alkanoylamino, such as acetylamino and propionylamino, benzoylamino or sulfo.

Together with the nitrogen atom linking them, $R_1$ and $R_2$ can form a 5-membered, 6-membered or 7-membered ring each of which is unsubstituted or substituted by heteroatoms, for example —O—, —S— or —NH—. Examples which may be mentioned are piperazinyl, piperidinyl or morpholinyl.

M is a cation, in particular hydrogen, an alkali metal ion or alkaline earth metal ion or $NH_4^\oplus$, or an organic ammonium compound. Examples which may be mentioned are $H^\oplus$, $Na^\oplus$, $Li^\oplus$, $K^\oplus$, $NH_4^\oplus$, and $C_1$-$C_4$alkylammonium.

Preferred azo dyes of the formula (1) are those in which D is the radical of a diazo component of the benzene or naphthalene series or of the heterocyclic series; D is especially thienyl, thiazolyl, 7-oxotetrahydrobenzo[b]thiophenyl, isothiazolyl, 1,2,4-thiadiazolyl, 1,3,4-thiadiazolyl, benzthiazolyl, benzisothiazolyl, pyrazolyl, imidazolyl, 1,2,3-triazolyl, 1,2,4-triazolyl, thiophenyl, benzthiophenyl, tetrahydrobenzo[b]thiophenyl, pyridinyl, indazolyl, phenyl or naphthyl, it being possible for each of the radicals mentioned to be substituted, in particular by $C_1$–$C_8$alkyl, $C_1$–$C_8$alkoxy, $C_2$–$C_8$alkanoyl, $C_2$–$C_8$alkanoylamino, $C_2$–$C_8$alkoxycarbonylamino, benzoylamino, amino, monoalkylamino or dialkylamino each of which has 1 to 8 carbon atoms in the alkyl radical, phenylamino, $C_2$–$C_8$alkoxycarbonyl, nitro, cyano, trifluoromethyl, halogen, sulfamoyl, sulfamoyl which is monosubstituted or disubstituted on the nitrogen atom by $C_1$–$C_4$alkyl, $C_5$–$C_7$cycloalkyl or phenyl, carbamoyl, ureido, hydroxyl, $C_1$–$C_8$alkylsulfonyl, phenylsulfonyl, phenylsulfonyl or phenoxysulfonyl each of which is substituted by $C_1$–$C_4$alkyl and/or sulfo and/or halogen, phenoxy or benzoyl each of which is unsubstituted or substituted by $C_1$–$C_4$alkyl and/or halogen, $C_5$–$C_7$cycloalkylcarbonyl, $C_1$–$C_8$alkylthio, benzisothiazolyl, benzthiazolyl, benzisooxazolyl or benzoxazolyl each of which is unsubstituted or substituted by $C_1$–$C_4$alkyl and/or halogen, phenylazo, carboxyl, sulfomethyl, sulfo, sulfato or thiosulfato, and it being possible, if appropriate, for 2 adjacent substituents of the ring systems mentioned to form in each case further fused phenyl rings or cyclohexyl rings.

D is especially phenyl, naphthyl, thiophenyl, 7-oxotetrahydrobenzo[b]thiophenyl, tetrahydrobenzo[b]thiophenyl, benzthiophenyl, benzthiazolyl, benzisothiazolyl or 1,3,4-thiadiazolyl, it being possible for the radicals indicated to be substituted by the substituents listed above.

Azo dyes of the formula (1) which are particularly preferred are those in which D is phenyl, naphthyl, thiophenyl, 7-oxotetrahydrobenzo[b]thiophenyl, tetrahydrobenzo[b]thiophenyl, benzthiophenyl, benzthiazolyl, benzisothiazolyl or 1,3,4-thiadiazolyl, it being possible for each of the radicals mentioned to be further substituted by $C_1$–$C_8$alkyl, $C_1$–$C_8$alkoxy, $C_2$–$C_8$alkanoyl, $C_1$–$C_8$alkoxycarbonyl, cyano, trifluoromethyl, halogen, sulfamoyl, sulfamoyl which is monosubstituted or disubstituted on the nitrogen atom by $C_1$–$C_4$alkyl, $C_5$–$C_7$cycloalkyl or phenyl, $C_1$–$C_8$alkylsulfonyl, phenylsulfonyl, phenylsulfonyl or phenoxysulfonyl each of which is substituted by $C_1$–$C_4$alkyl and/or sulfo and/or halogen, phenoxy or benzoyl each of which is unsubstituted or substituted by $C_1$–$C_4$alkyl and/or halogen, $C_5$–$C_7$cycloalkylcarbonyl, $C_1$–$C_8$alkylthio, benzisothiazolyl, benzthiazolyl, benzisooxazolyl or benzoxazolyl each of which is unsubstituted or substituted by $C_1$–$C_4$alkyl and/or halogen, and phenylazo.

Azo dyes of the formula (1) which are very particularly preferred are those in which D is the radical of the formula

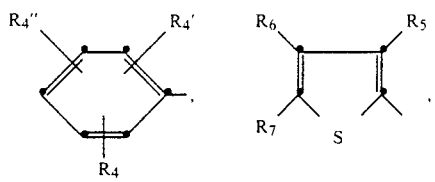

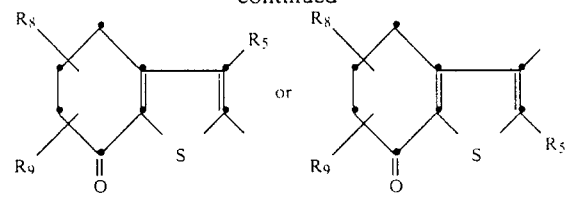

in which $R_4$, $R_4'$ and $R_4''$ independently of one another are each hydrogen, a sulfamoyl radical which is unsubstituted or monosubstituted or disubstituted on the nitrogen atom by $C_1$–$C_4$alkyl, $C_5$–$C_7$cycloalkyl or phenyl, a phenoxysulfonyl radical which is unsubstituted or substituted by halogen, $C_1$–$C_8$alkoxy, trifluoromethyl, halogen, sulfamoyl, $C_1$–$C_8$alkylsulfonyl, phenylsulfonyl, phenylsulfonyl which is substituted by $C_1$–$C_4$alkyl and/or halogen, or phenoxy or phenylazo each of which is unsubstituted or substituted by $C_1$–$C_4$alkyl, $R_5$ is —CN, —CON($R_{10}$)$R_{11}$, —COR$_{12}$, —COOR$_{13}$, —SO$_2$R$_{14}$ or —CONHNHR$_{15}$, $R_6$ is hydrogen or $C_1$–$C_4$alkyl, $R_7$ is a $C_1$–$C_{10}$alkyl, $C_1$–$C_{10}$alkoxy, $C_5$–$C_7$cycloalkyl, $C_5$–$C_7$cycloalkoxy, phenyl, phenoxy, naphthyl, naphthoxy, thienyl, thiazolyl, isothiazolyl, 1,2,4-thiadiazolyl, benzthiazolyl, benzisothiazolyl, pyrazolyl, imidazolyl, 1,2,3-triazolyl, 1,2,4-triazolyl, thiophenyl, benzthiophenyl, tetrahydrobenzthiophenyl, pyridinyl, pyrimidinyl, indazolyl, oxazolyl, benzoxazolyl or pyrazinyl radical each of which can be linked via a carbonyl group and is unsubstituted or substituted, it being possible for the radicals mentioned to be further substituted, and $R_8$ and $R_9$ independently of one another are hydrogen, $C_1$–$C_4$alkyl or phenyl, and those in which $R_{10}$, $R_{11}$ and $R_{15}$ independently of one another are hydrogen or $C_1$–$C_{10}$alkyl, $C_5$–$C_7$cycloalkyl, phenyl or naphthyl each of which is unsubstituted or substituted, and $R_{12}$, $R_{13}$ and $R_{14}$ are $C_1$–$C_{10}$alkyl, $C_5$–$C_7$cycloalkyl, phenyl or naphthyl each of which is unsubstituted or substituted, and azo dyes of the formula (1) in which D is benzisothiazolyl which is unsubstituted or substituted by $C_1$–$C_8$alkyl and/or halogen, 1,3,4-thiadiazolyl which is substituted by $C_1$–$C_8$alkylthio, benzthiazolyl which is substituted by halogen, $C_1$–$C_8$alkoxy, $C_1$–$C_8$alkylsulfonyl or $C_1$–$C_8$alkylthio, tetrahydrobenzo[b]thiophenyl which is substituted by $C_1$–$C_8$alkoxycarbonyl, benzthiophenyl which is substituted by $C_1$–$C_8$alkoxycarbonyl and/or halogen, or naphthyl which is substituted by sulfamoyl.

Substituted or unsubstituted $C_1$–$C_{10}$alkyl which is suitable for $R_7$, $R_{10}$, $R_{11}$, $R_{12}$, $R_{13}$, $R_{14}$ and $R_{15}$ is as defined above for $R_1$ and $R_2$.

Substituted or unsubstituted $C_5$–$C_7$cycloalkyl which is suitable for $R_7$, $R_{10}$, $R_{11}$, $R_{12}$, $R_{13}$, $R_{14}$ and $R_{15}$ is as defined above for $R_1$ and $R_2$.

Substituted or unsubstituted phenyl which is suitable for $R_7$, $R_8$, $R_9$, $R_{10}$, $R_{11}$, $R_{12}$, $R_{13}$, $R_{14}$ and $R_{15}$ is, in addition to unsubstituted phenyl, radicals containing, for example, the following substituents: $C_1$–$C_4$alkyl, such as methyl, ethyl, propyl, isopropyl, butyl, isobutyl, sec-butyl and tert-butyl, $C_1$–$C_4$alkoxy, such as methoxy, ethoxy, propoxy, isopropoxy, butoxy, isobutoxy, sec-butoxy and tert-butoxy, halogen, such as fluorine, chlorine and bromine, $C_2$–$C_4$alkanoylamino, such as acetylamino and propionylamino, benzoylamino or sulfo.

Substituted or unsubstituted naphthyl which is suitable for $R_7$, $R_{10}$, $R_{11}$, $R_{12}$, $R_{13}$, $R_{14}$ and $R_{15}$ is, in addition to unsubstituted naphthyl, radicals containing, for example, the following substituents: $C_1$–$C_4$alkyl, such as methyl, ethyl, propyl, isopropyl, butyl, isobutyl, sec-butyl and tert-butyl, $C_1$–$C_4$alkoxy, such as methoxy, ethoxy, propoxy, isopropoxy, butoxy, isobutoxy, sec-butoxy and tert-butoxy, halogen, such as fluorine, chlorine and bromine, $C_2$–$C_4$alkanoylamino, such as acetylamino and propionylamino, benzoylamino or sulfo.

The following are examples of substituted or unsubstituted $C_1$–$C_{10}$alkoxy which is suitable for $R_7$: methoxy, ethoxy, propoxy, isopropoxy, butoxy, isobutoxy, sec-butoxy, tert-butoxy, hexyloxy and octyloxy, and also the corresponding radicals which are substituted, for example, by alkoxy having 1 to 4 carbon atoms, for example β-methoxyethoxy and β-ethoxyethoxy.

Substituted or unsubstituted phenoxy which is suitable for $R_7$ is an unsubstituted phenoxy radical or a phenoxy radical which is substituted by $C_1$–$C_4$alkyl, such as methyl, ethyl, propyl, isopropyl, butyl, isobutyl, sec-butyl and tert-butyl, $C_1$–$C_4$alkoxy, such as methoxy, ethoxy, propoxy, isopropoxy, butoxy, isobutoxy, sec-butoxy and tert-butoxy, halogen, such as fluorine, chlorine and bromine, $C_2$–$C_4$alkanoylamino, such as acetylamino and propionylamino, benzoylamino and sulfo.

Substituted or unsubstituted naphthoxy which is suitable for $R_7$ is an unsubstituted naphthoxy radical or a naphthoxy radical which is substituted by $C_1$–$C_4$alkyl, such as methyl, ethyl, propyl, isopropyl, butyl, isobutyl, sec-butyl and tert-butyl, $C_1$–$C_4$alkoxy, such as methoxy, ethoxy, propoxy, isopropoxy, butoxy, isobutoxy, sec-butoxy and tert-butoxy, halogen, such as fluorine, chlorine and bromine, $C_2$–$C_4$alkanoylamino, such as acetylamino and propionylamino, benzoylamino and sulfo.

The following are examples of $C_5$–$C_7$cycloalkoxy which is suitable for $R_7$: cyclopentoxy, cyclohexyloxy and cycloheptyloxy, and also the corresponding radicals which are substituted, for example, by halogen, such as fluorine, chlorine or bromine, $C_1$–$C_4$alkyl, such as methyl, ethyl, propyl, isopropyl, butyl, isobutyl, sec-butyl and tert-butyl, and $C_1$–$C_4$alkoxy, such as methoxy, ethoxy, propoxy, isopropoxy, butoxy, isobutoxy, sec-butoxy and tert-butoxy. The methylcyclohexyloxy radical may be mentioned as an example.

The following are examples of $C_1$–$C_4$alkyl which is suitable for $R_6$, $R_8$ and $R_9$: methyl, ethyl, n-propyl, isopropyl, n-butyl, isobutyl and tert-butyl.

Examples of $C_1$–$C_8$alkyl which is suitable as a substituent of the benzisothiazolyl or benzthiazolyl radical D are methyl, ethyl, propyl, isopropyl, butyl, isobutyl, sec-butyl, tert-butyl, pentyl, hexyl, heptyl or octyl, in particular methyl.

Examples of $C_1$–$C_8$alkoxy which is suitable for $R_4$, $R_4'$, $R_4''$ and as a substituent of the benztiazolyl radical D independently of one another are methoxy, ethoxy, propoxy, isopropoxy, butoxy, isobutoxy, sec-butoxy, tert-butoxy, pentyloxy, hexyloxy, heptyloxy or octyloxy, in particular methoxy.

Examples of halogen which is suitable for $R_4$, $R_4'$ and $R_4''$ and as a substituent of the benzisothiazolyl, benzthiazolyl or benzthiophenyl radical D independently of one another are fluorine, bromine or, in particular, chlorine.

Examples of $C_1$–$C_8$alkylsulfonyl which is suitable for $R_4$, $R_4'$ and $R_4''$ and as a substituent of the benzthiazolyl radical D independently of one another are methylsulfonyl, ethylsulfonyl, propylsulfonyl, isopropylsulfonyl, butylsulfonyl, isobutylsulfonyl, sec-butylsulfonyl, tert-butylsulfonyl, pentylsulfonyl, hexylsulfonyl, heptylsulfonyl or octylsulfonyl, in particular methylsulfonyl or ethylsulfonyl.

Examples of $C_1$–$C_8$alkoxycarbonyl which is suitable as a substituent of the tetrahydrobenzo[b]thiophenyl or benzthiophenyl radical D are methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, hexyloxycarbonyl, heptyloxycarbonyl or octyloxycarbonyl, in particular methoxycarbonyl.

Examples of $C_1$–$C_8$alkylthio which is suitable as a substituent of the benzthiazolyl or 1,3,4-thiadiazolyl radical D are methylthio, ethylthio, propylthio, isopropylthio, butylthio, isobutylthio, sec-butylthio, tert-butylthio, pentylthio, hexylthio, heptylthio or octylthio, in particular methylthio, ethylthio or hexylthio.

The following are also examples of radicals suitable for $R_4$, $R_4'$ and $R_4''$, independently of one another: N-methyl-N-cyclohexylsulfamoyl, N-ethyl-N-phenylsulfamoyl, phenoxysulfonyl, o-chlorophenoxysulfonyl, bromine, chlorine, sulfamoyl, methoxy, ethoxy, N-phenylsulfamoyl, N,N-dimethylsulfamoyl, N,N-diethylsulfamoyl, phenylsulfonyl, p-methylphenylsulfonyl, p-chlorophenylsulfonyl, o-methylphenoxy, phenoxy, phenylazo, methylsulfonyl, ethylsulfonyl and trifluoromethyl.

The following are examples of $C_1$–$C_4$alkyl which is suitable for $R_8$ and $R_9$: methyl, ethyl, n-propyl, isopropyl, n-butyl, sec-butyl, isobutyl and tert-butyl.

In particular, the azo dyes of the formula (1) contain only one single sulfonic acid group.

Azo dyes of the formula (1) which are particularly preferred are those in which $R_1$ and $R_2$ independently of one another are $C_1$–$C_4$alkyl or benzyl; especially if these azo dyes contain the preferred and particularly preferred radicals D.

Azo dyes of the formula (1) which are also particularly preferred are those in which $R_3$ is hydrogen, $C_1$–$C_4$alkyl, $C_1$–$C_4$alkoxy or chlorine; especially if these azo dyes contain the particularly preferred radicals $R_1$ and $R_2$ and also the preferred, particularly preferred and very particularly preferred radicals D.

The azo dyes of the formula (1) in which X is —CO— are particularly preferred; especially if these azo dyes contain the preferred radicals D, $R_1$, $R_2$ and $R_3$ indicated above.

The azo dyes of the formula (1) in which n is the number 1 or 2 are also particularly preferred; especially if these azo dyes contain the preferred radicals D, $R_1$, $R_2$ $R_3$ and X indicated above.

Azo dyes of the formula

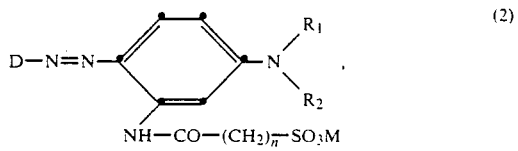

(2)

which are very particularly important are those in which D is phenyl which is substituted by N-methyl-N-cyclohexylsulfamoyl, N-ethyl-N-phenylsulfamoyl, N-methyl-N-cycloheptylsulfamoyl, 2'-chlorophenoxysulfonyl, chlorine, sulfamoyl, methoxy, N-phenylsulfamoyl, N,N-dimethylsulfamoyl, phenylsulfonyl, p-methylphenylsulfonyl, p-chlorophenylsulfonyl, o-methylphenoxy, phenoxy, phenylazo, methylsulfonyl, ethylsulfonyl or trifluoromethyl, or in which D is 3,5-diethoxycarbonyl-4-methylthiophenyl, 3-methoxycarbonyl-5-isobutyrylthiophenyl, 3-methoxycarbonyl-5-cyclohexylcarbonylthiophenyl, 3-methoxycarbonyl-5-(4'-methylbenzoyl)thiophenyl, 3-ethoxycarbonyl-5-(benzthiazol-2'-yl)thiophenyl, 3-ethoxycarbonyl-5-(benzoxazol-2'-yl)thiophenyl, 3-cyano-5-(benzthiazol-2'-yl)thiophenyl, 3,5-dimethoxycarbonyl-4-methylthiophenyl, 7-oxo-3-methoxycarbonyl-4,5,6,7-tetrahydrobenzo[b]thiophenyl, 7-oxo-3-methoxy-6-methyl-4,5,6,7-tetrahydrobenzo[b]thiophenyl, 7-oxo-3-cyano-5,5-dimethyl-4,5,6,7-tetrahydrobenzo[b]thiophenyl, 2-methoxycarbonyl-4,5,6,7-tetrahydrobenzo[b]thiophenyl, 3-methoxycarbonyl-4,5,6,7-tetrahydrobenzo[b]thiophenyl, 2-methoxycarbonyl-4-chlorobenzo[b]thiophenyl, 3-methoxycarbonylbenzo[b]thiophenyl, benzthiazolyl, 6-chlorobenzthiazolyl, 6-methoxybenzthiazolyl, 6-methylbenzthiazolyl, 4-chlorobenzthiazolyl, 4-methylbenzthiazolyl, 6-methylsulfonylbenzthiazolyl, 6-methylthiobenzthiazolyl, benzisothiazolyl, 5-chlorobenzisothiazolyl, 5-ethylthio-1,3,4-thiadiazolyl, 5-hexylthio-1,3,4-thiadiazolyl or 5-sulfamoylnaphthyl, $R_1$ is ethyl and $R_2$ is ethyl or benzyl, n is the number 1 or 2 and M is hydrogen, an alkali metal cation, ammonium or $C_1$-$C_4$alkylammonium.

The invention also relates to a process for the preparation of the azo dyes of the formula (1), which comprises diazotizing an amine of the formula $$D-NH_2 \quad (3)$$

and coupling the product with a coupling component of the formula

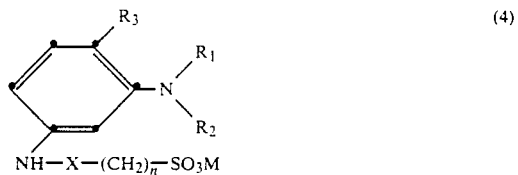

(4)

D, $R_1$, $R_2$, $R_3$, X, M and n in the formulae (3) and (4) being as defined in formula (1).

The diazotization of the diazo component of the formula (3) is carried out, as a rule, by the action of nitrous acid in an aqueous mineral acid solution at a low temperature, and the coupling with the coupling component of the formula (4) is carried out at acid and neutral to alkaline pH values.

If desired, a free amino group in the radical D can be converted after the coupling into an acylamino or alkylamino group by means of an acylating or alkylating agent, and similarly a hydroxyl group can be converted into an acyloxy or alkoxy group by acylation or alkylation.

A free hydroxyl group can also be converted into a group which imparts solubility in water, for example can be converted into a sulfato group by sulfation.

In the process according to the invention it is preferable to use amines of the formula (3) in which D is a diazo component of the benzene or naphthalene series or of the heterocyclic series, in particular to use diazo components in which D is thienyl, thiazolyl, 7-oxotetrahydrobenzo[b]thiophenyl, isothiazolyl, 1,2,4-thiadiazolyl, 1,3,4-thiadiazolyl, benzthiazolyl, benzisothiazolyl, pyrazolyl, imidazolyl, 1,2,3-triazolyl, 1,2,4-triazolyl, thiophenyl, benzthiophenyl, tetrahydrobenzthiophenyl, pyridinyl, indazolyl, phenyl or naphthyl, it being possible for each of the radicals mentioned to be substituted by $C_1$-$C_8$alkyl, $C_1$-$C_8$alkoxy, $C_2$-$C_8$alkanoyl, $C_2$-$C_8$alkanoylamino, $C_1$-$C_8$alkoxycarbonylamino, benzoylamino, amino, monoalkylamino or dialkylamino each of which has 1 to 8 carbon atoms in the alkyl radical, phenylamino, $C_2$-$C_8$alkoxycarbonyl, nitro, cyano, trifluoromethyl, halogen, sulfamoyl, sulfamoyl which is monosubstituted or disubstituted on the nitrogen atom by $C_1$-$C_4$alkyl, $C_5$-$C_7$cycloalkyl or phenyl, carbamoyl, ureido, hydroxyl, $C_1$-$C_8$alkylsulfonyl, phenylsulfonyl, phenylsulfonyl or phenoxysulfonyl each of which is substituted by $C_1$-$C_4$alkyl and/or sulfo and/or halogen, phenoxy or benzoyl each of which is unsubstituted or substituted by $C_1$-$C_4$alkyl and/or halogen, $C_5$-$C_7$cycloalkylcarbonyl, $C_1$-$C_8$alkylthio, benzisothiazolyl, benzthiazolyl, benzisooxazolyl or benzoxazolyl each of which is unsubstituted or substituted by $C_1$-$C_4$alkyl and/or halogen, phenylazo, carboxyl, sulfomethyl, sulfo, sulfato or thiosulfato, and it being possible, if appropriate, for 2 adjacent substituents of the ring systems mentioned in each case to form further fused phenyl rings or cyclohexyl rings.

The diazo component D used in the process according to the invention is, in particular, phenyl, naphthyl, thiophenyl, 7-oxotetrahydrobenzo[b]thiophenyl, tetrahydrobenzo[b]thiophenyl, benzthiophenyl, benzthiazolyl, benzisothiazolyl or 1,3,4-thiadiazolyl, it being possible for the radicals indicated to be substituted by the substituents listed above.

Preferred embodiments of the process according to the invention comprise using a diazo component of the formula (3) in which D is phenyl, naphthyl, thiophenyl, 7-oxotetrahydrobenzo[b]thiophenyl, tetrahydrobenzo[b]thiophenyl, benzthiophenyl, benzthiazolyl, benzisothiazolyl or 1,3,4-thiadiazolyl, it being possible for each of the radicals mentioned to be further substituted by $C_1$-$C_8$alkyl, $C_1$-$C_8$alkoxy, $C_2$-$C_8$alkanoyl, $C_1$-$C_8$alkoxycarbonyl, cyano, trifluoromethyl, halogen, sulfamoyl, sulfamoyl which is monosubstituted or disubstituted by $C_1$-$C_4$alkyl, $C_5$-$C_7$cycloalkyl or phenyl, $C_1$-$C_8$alkylsulfonyl, phenylsulfonyl, phenylsulfonyl or phenoxysulfonyl each of which is substituted by $C_1$-$C_4$alkyl and/or sulfo and/or halogen, phenoxy or benzoyl each of which is unsubstituted or substituted by $C_1$-$C_4$alkyl and/or halogen, $C_5$-$C_7$cycloalkylcarbonyl, $C_1$-$C_8$alkylthio or benzisothiazolyl, benzthiazolyl, benzisooxazolyl, benzoxazolyl or phenylazo each of which is unsubstituted or substituted by $C_1$-$C_4$alkyl.

Other preferred embodiments of the process according to the invention comprise using as the diazo component D the radical of the formula

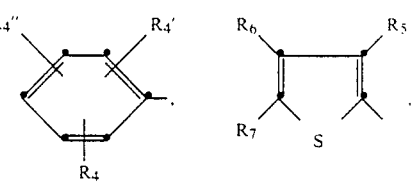

-continued

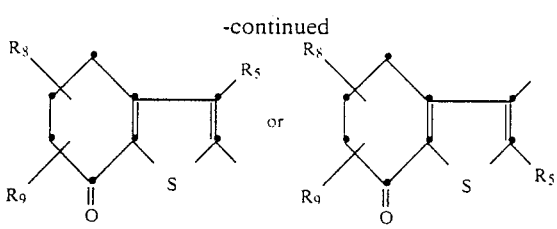

in which $R_4$, $R_4'$ and $R_4''$ independently of one another are each hydrogen, a sulfamoyl radical which is unsubstituted or monosubstituted or disubstituted on the nitrogen atom by $C_1$–$C_4$alkyl, $C_5$–$C_7$cycloalkyl or phenyl, a phenoxysulfonyl radical which is unsubstituted or substituted by halogen, $C_1$–$C_8$alkoxy, trifluoromethyl, halogen, sulfamoyl, $C_1$–$C_8$alkylsulfonyl, phenylsulfonyl, phenylsulfonyl which is substituted by $C_1$–$C_4$alkyl and/or halogen, or phenoxy or phenylazo each of which is unsubstituted or substituted by $C_1$–$C_4$alkyl, $R_5$ is —CN, —CON($R_{10}$)$R_{11}$, —COR$_{12}$, —COOR$_{13}$, —SO$_2$R$_{14}$ or —CONHNHR$_{15}$, $R_6$ is hydrogen or $C_1$–$C_4$alkyl, $R_7$ is a $C_1$–$C_{10}$alkyl, $C_1$–$C_{10}$alkoxy, $C_5$–$C_7$cycloalkyl, $C_5$–$C_7$cycloalkoxy, phenyl, phenoxy, naphthyl, naphthoxy, thienyl, thiazolyl, isothiazolyl, 1,2,4-thiadiazolyl, benzthiazolyl, benzisothiazolyl, pyrazolyl, imidazolyl, 1,2,3-triazolyl, 1,2,4-triazolyl, thiophenyl, benzthiophenyl, tetrahydrobenzthiophenyl, pyridinyl, pyrimidinyl, indazolyl, oxazolyl, benzoxazolyl or pyrazinyl radical which, if appropriate, is linked via a carbonyl group and is substituted or unsubstituted, it being possible for the radicals mentioned to be further substituted, and $R_8$ and $R_9$ independently of one another are hydrogen, $C_1$–$C_4$alkyl or phenyl, and in which $R_{10}$, $R_{11}$ and $R_{15}$ independently of one another are hydrogen or $C_1$–$C_{10}$alkyl, $C_5$–$C_7$cycloalkyl, phenyl or naphthyl each of which is substituted or unsubstituted, and $R_{12}$, $R_{13}$ and $R_{14}$ are $C_1$–$C_{10}$alkyl, $C_5$–$C_7$cycloalkyl, phenyl or naphthyl each of which is substituted or unsubstituted, or using, as the diazo component D, benzisothiazolyl which is unsubstituted or substituted by $C_1$–$C_8$alkyl and/or halogen, 1,3,4-thiadiazolyl which is substituted by $C_1$–$C_8$alkylthio, benzthiazolyl which is substituted by halogen, $C_1$–$C_8$alkoxy, $C_1$–$C_8$alkyl, $C_1$–$C_8$alkylsulfonyl or $C_1$–$C_8$alkylthio, tetrahydrobenzo[b]thiophenyl which is substituted by $C_1$–$C_8$alkoxycarbonyl, benzthiophenyl which is substituted by $C_1$–$C_8$alkoxycarbonyl and/or halogen, or naphthyl which is substituted by sulfamoyl.

Amines of the formula (3) and coupling components of the formula (4) which together contain only one single sulfonic acid group are particularly used in the process according to the invention.

A particularly preferred embodiment of the process according to the invention comprises using a coupling component of the formula (4) in which $R_1$ and $R_2$ independently of one another are $C_1$–$C_4$alkyl.

An embodiment of the process according to the invention which is also particularly preferred comprises using a coupling component of the formula (4) in which $R_3$ is hydrogen, $C_1$–$C_4$alkyl, $C_1$–$C_4$alkoxy or chlorine; a coupling component of the formula (4) in which $R_1$, $R_2$ and $R_3$ have the meanings particularly preferred is especially used.

Another particularly preferred embodiment of the process according to the invention comprises using a coupling component of the formula (4) in which X is —CO—; a coupling component of the formula (4) in which $R_1$, $R_2$, $R_3$ and X have the meanings particularly preferred is especially used.

Another particularly preferred embodiment of the process according to the invention comprises using a coupling component of the formula (4) in which n is the number 1 or 2; a coupling component of the formula (4) in which $R_1$, $R_2$, $R_3$, X and n have the meanings particularly preferred is especially used.

The particularly important azo dyes of the formula (2) are prepared by diazotizing an amine of the formula (3) in which D is as defined in formula (2) and coupling the product with a coupling component of the formula

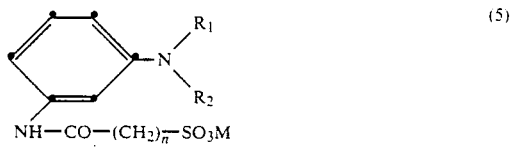

(5)

in which $R_1$, $R_2$, n and M are as defined in formula (2).

Of the large number of possible amines of the formula (3), the following are examples of suitable amines: 2-Amino-3-methoxycarbonyl-5-phenylthiophene, 2-amino-3-carbonamido-5-phenylthiophene, 2-amino-3-methoxycarbonylthiophene, 2-amino-3-methoxycarbonyl-5-benzoylthiophene, 2-amino-3-methoxycarbonyl-5-isobutyrylthiophene, 2-amino-3-phenylsulfonyl-5-acetylthiophene, 2-amino-3-methylsulfonylacetylthiophene, 2-amino-3-carbonamido-5-ethoxycarbonylthiophene, 2-amino-3-carbonamido-5-butyrylthiophene, 2-amino-3-β-hydroxyethylaminocarbonyl-5-isobutyrylthiophene, 2-amino-3-β-sulfatoethylaminocarbonyl-5-isobutyrylthiophene (prepared by sulfating 2-amino-3-β-hydroxyethylaminocarbonyl-5-butyrylthiophene), 2-amino-3-γ-methoxypropylaminocarbonyl-5-isobutyrylthiophene, 2-amino-3-butylaminocarbonyl-5-isobutyrylthiophene, 2-amino-3-phenylsulfonylthiophene, 2-amino-3-ethoxycarbonyl-4-methyl-5-propionylthiophene, 2-amino-3-methoxycarbonyl-4-methyl-5-acetylthiophene, 2-amino-3-methoxycarbonyl-5-cyclohexylcarbonylthiophene, 2-amino-3-methoxy-carbonyl-5-(p-methylbenzoyl)-thiophene, 2-amino-3-methoxycarbonyl-5-(p-methoxybenzoyl)-thiophene, 2-amino-3-methoxycarbonyl-5-(p-chlorobenzoyl)-thiophene, 2-amino-3-methoxycarbonyl-5-(o-, m- or p-sulfobenzoyl)-thiophene, 2-amino-3,5-diethoxycarbonyl-4-methylthiophene, 2-amino-3,5-dimethoxycarbonyl-4-methylthiophene, 2-amino-3-ethoxycarbonyl-5-(benzthiazol-2'-yl)-thiophene, 2-amino-3-ethoxycarbonyl-5-(benzoxazol-2'-yl)-thiophene, 2-amino-3-cyano-5-(benzthiazol-2'-yl)-thiophene, 2-amino-1,3-benzthiazol, 2-amino-6-methyl-1,3-benzthiazol, 2-amino-6-ethyl-1,3-benzthiazol, 2-amino-6-tert-butyl-1,3-benzthiazol, 2-amino-4-methyl-1,3-benzthiazol, 2-amino-4-propyl-1,3-benzthiazol, 2-amino-4-propyl-1,3-benzthiazol, 2-amino-4,6-dimethyl-1,3-benzthiazol, 2-amino-5-methyl-1,3-benzthiazol, 2-amino-6-β-hydroxyethyl-1,3-benzthiazol, 2-amino-6-methoxy-1,3-benzthiazol, 2-amino-6-ethoxy-1,3-benzthiazol, 2-amino-6-propoxy-1,3-benzthiazol, 2-amino-6-butoxy-1,3-benzthiazol, 2-amino-4-methoxy-1,3-benzthiazol, 2-amino-4-ethoxy-1,3-benzthiazol, 2-amino-4,6-dimethoxy-1,3-benzthiazol, 2-amino-5,6-dimethoxy-1,3-benzthiazol, 2-amino-5-methoxy-6-ethoxy-1,3-benzthiazol, 2-amino-6-hydroxyethoxy-1,3-benzthiazol, 2-amino-6-ethoxy-1,3-benzthiazol, 2-amino-6-phenyl-1,3-benzthiazol, 2-amino-6-

(4'-chlorophenyl)-1,3-benzthiazol, 2-amino-6-phenoxy-1,3-benzthiazol, 2-amino-6-(4'-chlorophenoxy)-1,3-benzthiazol, 2-amino-6-(4'-methylphenoxy)1,3-benzthiazol, 2-amino-6-(2',4'-dichlorophenoxy)-1,3-benzthiazol, 2-amino-6-methylthio-1,3-benzthiazol, 2-amino-6-propylthio-1,3-benzthiazol, 2-amino-6-hydroxyethylthio-1,3-benzthiazol, 2-amino-6-chloro-1,3-benzthiazol, 2-amino-4-chloro-1,3-benzthiazol, 2-amino-5-chloro-1,3-benzthiazol, 2-amino-4,6-dichloro-1,3-benzthiazol, 2-amino-5,6-dichloro-1,3-benzthiazol, 2-amino-4,5,6,7-tetrachloro-1,3-benzthiazol, 2-amino-4-bromo-1,3-benzthiazol, 2-amino-6-bromo-1,3-benzthiazol, 2-amino-5-bromo-1,3-benzthiazol, 2-amino-6-fluoro-1,3-benzthiazol, 2-amino-6-trifluoromethyl-1,3-benzthiazol, 2-amino-4-trifluoromethyl-1,3-benzthiazol, 2-amino-4-trifluoromethyl-1,3-benzthiazol, 2-amino-6-nitro-1,3-benzthiazol, 2-amino-6-cyano-1,3-benzthiazol, 2-amino-6-formylamino-1,3-benzthiazol, 2-amino-6-acetylamino-1,3-benzthiazol, 2-amino-6-propionylamino-1,3-benzthiazol, 2-amino-6-benzoylamino-1,3-benzthiazol, 2-amino-6-(4'-methylbenzoylamino)-1,3-benzthiazol, 2-amino-6-(4'-chlorobenzoylamino)-1,3-benzthiazol, 2-amino-6-methylsulfonyloxy-1,3-benzthiazol, 2-amino-6-ethylsulfonyloxy-1,3-benzthiazol, 2-amino-6-phenylsulfonyloxy-1,3-benzthiazol, 2-amino-6-methoxycarbonyl-1,3-benzthiazol, 2-amino-6-ethoxycarbonyl-1,3-benzthiazol, 2-amino-6-propoxycarbonyl-1,3-benzthiazol, 2-amino-6-butoxycarbonyl-1,3-benzthiazol, 2-amino-4-methoxycarbonyl-1,3-benzthiazol, 2-amino-4-ethoxycarbonyl-1,3-benzthiazol, 2-amino-6-β-hydroxyethoxy-carbonyl-1,3-benzthiazol, 2-amino-6-β-hydroxypropoxycarbonyl-1,3-benzthiazol, 2-amino-6-methoxyethoxycarbonyl-1,3-benzthiazol, 2-amino-6-methoxypropoxycarbonyl-1,3-benzthiazol, 2-amino-6-phenoxycarbonyl-1,3-benzthiazol, 2-amino-6-cyclohexyloxycarbonyl-1,3-benzthiazol, 2-amino-6-methylsulfonyl-1,3-benzthiazol, 2-amino-6-ethylsulfonyl-1,3-benzthiazol, 2-amino-4-methylsulfonyl-1,3-benzthiazol, 2-amino-4-butylsulfonyl-1,3-benzthiazol, 2-amino-6-β-cyanoethylsulfonyl-1,3-benzthiazol, 2-amino-6-β-chloroethylsulfonyl-1,3-benzthiazol, 2-amino-6-β-hydroxyethylsulfonyl-1,3-benzthiazol, 2-amino-6-methoxysulfonyl-1,3-benzthiazol, 2-amino-6-ethoxysulfonyl-1,3-benzthiazol, 2-amino-6-phenoxysulfonyl-1,3-benzthiazol, 2-amino-6-aminosulfonyl-1,3-benzthiazol, 2-amino-6-dimethylamino-sulfonyl-1,3-benzthiazol, 2-amino-6-phenylaminosulfonyl-1,3-benzthiazol, 2-amino-6-isopropylaminosulfonyl-1,3-benzthiazol, 2-amino-6-dibutylaminosulfonyl-1,3-benzthiazol, 2-amino-6-benzylaminosulfonyl-1,3-benzthiazol, 2-amino-6-cyclohexylaminosulfonyl-1,3-benzthiazol, 2-amino-β-hydroxyethylaminosulfonyl-1,3-benzthiazol, 2-amino-6-morpholinosulfonyl-1,3-benzthiazol, 2-amino-1,3-benzthiazol-6-sulfonic acid, 2-amino-1,3-benzthiazol-4-sulfonic acid, 5-amino-1,2,4-thiadiazol, 5-amino-3-methyl-1,2,4-thiadiazol, 5-amino-3-phenyl-1,2,4-thiadiazol, 5-amino-3-(2'-cyanophenyl)-1,2,4-thiadiazol, 2-amino-1,3,4-thiadiazol, 2-amino-5-methyl-1,3,4-thiadiazol, 2-amino-5-methylmercapto-1,3,4-thiadiazol, 2-amino-5-ethylthio-1,3,4-thiadiazol, 2-amino-5-hexylthio-1,3,4-thiadiazol, 2-amino-5-phenyl-1,3,4-thiadiazol, 2-amino-1,3,4-oxdiazol, 2-amino-5-methyl-1,3,4-oxdiazol, 2-amino-5-phenyl-1,3,4-oxdiazol, 3-amino-2,1-benzisothiazol, 3-amino-5-chloro-2,1-benzisothiazol, 3-amino-5-chloro-2,1-benzisothiazol, 3-amino-5-bromo-2,1-benzisothiazol, 3-amino-5-chloro-2,1-benzisothiazol, 3-amino-5-bromo-2,1-benzisothiazol, 3-amino-4-chloro-2,1-benzthiazol, 3-amino-4-bromo-2,1-benzthiazol, 3-amino-5,7-dichloro-2,1-benzisothiazol, 3-amino-5,7-dibromo-2,1-benzisothiazol, 3-amino-5-methyl-2,1-benzisothiazol, 3-amino-5-nitro-2,1-benzisothiazol, 3-amino-5-trifluoromethyl-2,1-benzisothiazol, 3-amino-5-acetylamino-2,1-benzisothiazol, 3-amino-5-nitro-7-bromo-2,1-benzisothiazol, 3-amino-5-methylsulfonyl-2,1-benzisothiazol, 3-amino-5-methoxy-2,1-benzisothiazol, aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, 1-aminobenzene-2-, -3- or -4-sulfonic acid N-methylamide, N-ethylamide, N,N-dimethylamide, N,N-diethylamide or N-methyl-N-cyclohexylamide, 1-amino-2-phenoxysulfonylbenzene, 1-amino-2-(2'-chlorophenoxysulfonyl)-benzene, 1-amino-4-methylsulfonylbenzene, 1-amino-4-ethylsulfonylbenzene, 1-amino-2-chloro-4-methylsulfonylbenzene, 1-amino-2,5-dichloro-4-sulfamoylbenzene, 1-amino-4-phenylazobenzene, 1-amino-2,5-dimethoxy-4-N-phenylsulfamoylbenzene, 1-amino-2-(4'-chlorophenylsulfonyl)-5-ethylsulfonylbenzene, 1-amino-2-trifluoromethylbenzene, 1-amino-2,5-dichloro-4-N,N-dimethylsulfamoylbenzene, 1-amino-2-phenylsulfonylbenzene, 1-amino-2-methoxy-5-chlorobenzene, 1-amino-2,4,5-trichlorobenzene, 1-amino-2,4-di(2'-methylphenoxy)-benzene, 1-amino-2-(4'-methylphenylsulfonyl)-benzene, 1-amino-2-(4'-methylphenyl)sulfonyl-5-sulfamoylbenzene, 2-amino-5-sulfamoylnaphthalene, 1-amino-5-sulfamoylnaphthalene, 2-amino-3-methoxycarbonyl-7-oxo-4,5,6,7-tetrahydrobenzo[b]thiophene, 2-amino-3-ethoxycarbonyl-7-oxo-4,5,6,7-tetrahydrobenzo[b]thiophene, 2-amino-3-methoxycarbonyl-6-methyl-7-oxo-4,5,6,7-tetrahydrobenzo[b]thiophene, 2-amino-3-ethoxycarbonyl-6-methyl-7-oxo-4,5,6,7-tetrahydrobenzo[b]thiophene, 2-amino-3-cyano-5,5-dimethyl-7-oxo-4,5,6,7-tetrahydrobenzo[b]thiophene, 2-methoxycarbonyl-3-amino-4,5,6,7-tetrahydrobenzo[b]thiophene and 2-ethoxycarbonyl-3-amino-4,5,6,7-tetrahydrobenzo[b]thiophene.

The diazo components of the formula (3) are known per se or can be prepared analogously to known compounds.

The amines of the formula (3) and the coupling components of the formula (4) can contain radicals which can be converted into amino groups, for example the acetylamino group and the nitro group. For example, an acetylamino group can be converted into an amino group by saponification and a nitro group can be converted into an amino group by reduction, advantageously subsequent to the preparation of the dyes of the formula (1).

The invention also relates to the compounds of the formula (4), in particular the compounds of the formula (4) containing the abovementioned, particularly preferred radicals, and also the combination of the particularly preferred radicals.

The compounds of the formula (4) are obtained, for example, by reacting a compound of the formula

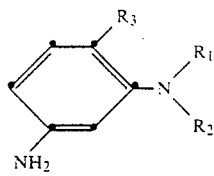

(6)

in which $R_1$, $R_2$ and $R_3$ are as defined in formula (4) with a compound which introduces the radical of the formula $$-X-(CH_2)_n-Hal \qquad (7)$$

in which X and n are as defined in formula (4) and Hal is halogen, and then replacing the halogen atom by an $-SO_3M$ group in which M is as defined in formula (4).

The reaction of the compound of the formula (4) with a compound which introduces the radical of the formula (7) is effected, for example, in organic solvents, for example tetrahydrofuran, dioxane, toluene or benzene, in the presence of a base, for example sodium acetate, and at a temperature between 0° and 50° C.

The replacement of the halogen atom by an $-SO_3M$ group is effected by methods known per se, for example by reacting the resulting reaction product with a compound of the formula $M_2SO_3$ or $MeSO_3$ in which M is as defined in formula (1) and Me is a divalent cation, at a pH from 5 to 11, in particular 5 to 9, and at a temperature between 70° and 130° C., in particular 70° to 100° C.

Examples of suitable compounds of the formula $MeSO_3$ are the alkaline earth metal salts, such as $CaSO_3$, $MgSO_3$ or $BaSO_3$.

The compound of the formula (4) can be obtained either by precipitation from aqueous solution by means of salts, for example NaCl, or by evaporating the reaction mixture.

The following may be mentioned as compounds of the formula (6): 3-N,N-diethylaminoaniline and 3-N,N-diethylamino-4-methoxyaniline.

The following may be mentioned as compounds which introduce the radical of the formula (7): chloroacetyl chloride and 3-chloropropionyl chloride.

Preferred embodiments of the process according to the invention for the preparation of the compounds of the formula (4) comprise using a compound of the formula (6) in which $R_1$ and $R_2$ independently of one another are $C_1$-$C_4$alkyl or benzyl;

using a compound of the formula (6) in which $R_3$ is hydrogen, $C_1$-$C_4$alkyl, $C_1$-$C_4$alkoxy or halogen, in particular chlorine;

using a compound of the formula (7) in which X is $-CO-$;

using a compound of the formula (7) in which n is the number 1 or 2;

using a compound of the formula (7) in which Hal is chlorine;

replacing the halogen atom by an $-SO_3M$ group at a pH from 5 to 11, in particular at a pH from 5 to 9;

replacing the halogen atom by an $-SO_3M$ group at a temperature from 70° to 130° C., in particular 70° to 100° C.;

replacing the halogen atom by an $-SO_3M$ group under pressure, in particular a pressure of 1 to 6 bar, preferably 1 to 3 bar; and replacing the halogen atom by an $-SO_3M$ group by reaction with a compound of the formula $M_2SO_3$ or $MeSO_3$ in which M is as defined in formula (1), in particular in which M is an alkali metal, preferably sodium, and Me is a divalent cation, in particular calcium or magnesium.

A particularly preferred embodiment of the process according to the invention for the preparation of the compounds of the formula (4) comprises using a compound (7) in which n is the number 1 or 2 and replacing the halogen atom by an $-SO_3M$ group at a pH from 5 to 11 and at a temperature from 70° to 130° C. by reaction with a compound of the formula $M_2SO_3$ or $MeSO_3$ in which M is as defined in formula (1), in particular in which M is an alkali metal, preferably sodium, and Me is a divalent cation.

A very particularly preferred embodiment of the process according to the invention for the preparation of the compounds of the formula (4) comprises using a compound of the formula (6) in which $R_1$ and $R_2$ independently of one another are $C_1$-$C_4$alkyl or benzyl and $R_3$ is hydrogen, $C_1$-$C_4$alkyl, $C_1$-$C_4$alkoxy or halogen, in particular hydrogen, $C_1$-$C_4$alkyl or $C_1$-$C_4$alkoxy, and using a compound of the formula (7) in which X is $-CO-$, n is the number 1 or 2 and Hal is chlorine.

The dyes of the formula (1), which contain a sulfo group that imparts solubility in water, are present either in the form of their free acid or, preferably, as salts thereof.

Examples of suitable salts are the alkali metal salts, alkaline earth metal salts or ammonium salts or the salts of an organic amine.

The sodium, lithium, potassium or ammonium salts or the salt of triethanolamine may be mentioned as examples.

The azo dyes according to the invention of the formula (1) are suitable, by methods known per se, for the dyeing and printing of, in particular, fibre materials containing nitrogen or containing hydroxyl groups, for example textile fibre materials composed of cellulose, silk and especially wool and synthetic polyamides. Level dyeings in orange, red, blue and grey shades are obtained with good overall fastness properties, in particular good fastness to rubbing, wet processing, wet rubbing and light, and also good resistance to formaldehyde. The dyes according to the invention can also be combined very well with other dyes. The abovementioned textile materials can be in a very wide variety of processing forms, for example as fibre, yarn, woven fabric or knitted fabric.

In the following examples parts are parts by weight. The temperatures are in degrees centigrade. The relationship between parts by weight and parts by volume is the same as that between grams and cubic centimeters.

EXAMPLE 1

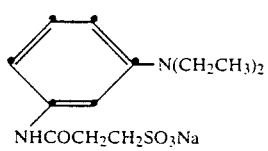

(101)

$NHCOCH_2CH_2SO_3Na$ 32.8 parts of 3-diethylaminoaniline and 100 parts of tetrahydrofuran are initially taken at approx. 20°, with stirring. After 32.8 parts of anhydrous sodium acetate have been introduced, 27.9 parts of 3-chloropropionyl chloride are added dropwise in the course of 90 minutes at such a rate that the internal temperature does not exceed 30°. Stirring is continued for a further 30 minutes, 70 parts of water are added and the organic phase is then separated off in a separating funnel. The organic phase is dried briefly over sodium sulfate and is then concentrated on a rotary evaporator. This gives 50 parts of a slightly brownish liquid which can be used in this form for the next section of the synthesis. The resulting compound has the formula

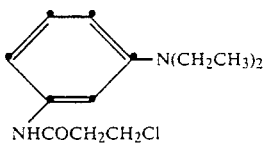
(102)

50 parts of the compound of the formula (102) are stirred with 150 parts of water for 10 minutes. The pH is adjusted to 7 at 20°, 27.7 parts of sodium sulfite are added and the mixture is stirred for 12 hours at 90°–95°. The water is then removed on a rotary evaporator, and the residue is stirred into 200 parts of acetone at approx. 20°. The mixture is then stirred briefly and the product is filtered off, rinsed with a little acetone and dried at 50° in a vacuum drying cabinet. 76 parts of a colourless powder are obtained. The resulting compound has the formula (101).

If the procedure described is repeated, using an equimolar amount of one of the amines indicated in column 2 of Table 1 below instead of the 32.8 parts of 3-diethylaminoaniline and using an equimolar amount of one of the acylating agents indicated in column 3 of Table 1 below instead of the 27.9 parts of 3-chloropropionyl chloride, after reacting the mixture with $Na_2SO_3$ for reaction times between 2 and 16 hours and at temperatures between 80° and 95°, the products indicated in column 4 are obtained.

TABLE 1

| Example | Amine | Acylating agent | Product |
|---|---|---|---|
| 2 | | $ClCCH_2Cl$ ‖ O | (103) |
| 3 | | $ClCCH_2Cl$ ‖ O | (104) |
| 4 | | $ClC(CH_2)_2Cl$ ‖ O | (105) |
| 5 | | $ClCCH_2Cl$ ‖ O | (106) |

EXAMPLE 6

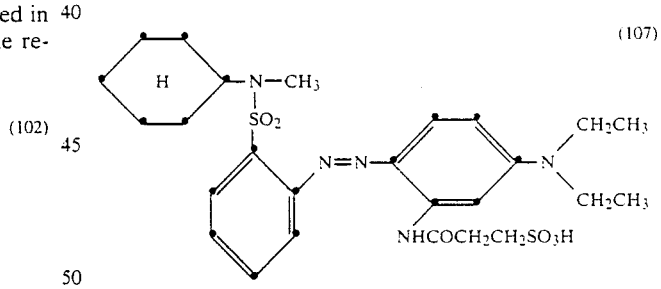
(107)

12 parts of isopropanol and 12 parts of water are initially taken at approx. 10°. After the mixture has been cooled to 5°, 2.03 parts of aniline-o-sulfonic acid N-methyl-N-cyclohexylamide and 4.5 parts of 32% HCl are added successively. Diazotization is then carried out at an internal temperature of 0° to 2° by means of 0.55 part of sodium nitrite in 3 parts of water, and stirring is continued for 3 hours at 2° to 3°. 1 part of sulfamic acid is then added, the mixture is stirred for a further 2 minutes and 3.9 parts of N-β-sulfopropionylamido-3-N,N-diethylaminobenzene are sprinkled in the course of approx. 1 minute. 4 parts of sodium acetate are added in 3 portions in the course of 15 minutes and stirring is continued for 3 hours at 0° to 5°. A solution consisting of 4 parts of sodium acetate, 2 parts of sodium carbonate and 20 parts of water is then added dropwise in the course of 30 minutes, and the product is then filtered off with suction. Drying is carried out in vacuo at 50°. This gives 2 parts of a red substance which, in the form of free acid, has the formula (107) and which dyes polyamide in orange-red shades.

If the procedure described is repeated, but using an equimolar amount of one of the amines indicated in column 2 of Table 2 below as the diazo component and using an equimolar amount of one of the coupling components indicated, in the form of the free acids, in column 3 of Table 2 below as the coupling component, dyes which dye synthetic polyamide in the shade indicated in column 4 of Table 2 below are obtained.

TABLE 2

| Example | Amine | Coupling Component | Shade on polyamide |
|---|---|---|---|
| 7 | phenyl-N(CH₃)-SO₂-(phenyl-NH₂) [H-N(CH₃)-SO₂ on benzene; other benzene with NH₂] | benzene with -N(CH₂CH₃)₂ and NHCOCH₂SO₃H | orange |
| 8 | 2-Cl-phenyl-O-SO₂-(phenyl-NH₂) | benzene with -N(CH₂CH₃)₂ and NHCOCH₂SO₃H | yellowish red |
| 9 | 2-Cl-phenyl-O-SO₂-(phenyl-NH₂) | benzene with -N(CH₂CH₃)₂ and NHCO(CH₂)₂SO₃H | yellowish red |
| 10 | H₂N-phenyl-SO₂CH₂CH₃ | benzene with -N(CH₂CH₃)₂ and NHCO(CH₂)₂SO₃H | orange |
| 11 | H₂N-(2-Cl)phenyl-SO₂CH₃ | benzene with -N(CH₂CH₃)₂ and NHCO(CH₂)₂SO₃H | yellowish red |
| 12 | H₂N-(2,5-diCl)phenyl-SO₂NH₂ | benzene with -N(CH₂CH₃)₂ and NHCO(CH₂)₂SO₃H | yellowish red |
| 13 | H₂N-phenyl-N=N-phenyl | benzene with -N(CH₂CH₃)₂ and NHCO(CH₂)₂SO₃H | red |

TABLE 2-continued

| Example | Amine | Coupling Component | Shade on polyamide |
|---|---|---|---|
| 14 | 4-amino-2,6-dimethoxyphenyl-SO$_2$NH-phenyl | 4-N(CH$_2$CH$_3$)$_2$-phenyl-NHCO(CH$_2$)$_2$SO$_3$H | yellowish red |
| 15 | 4-amino-2-(4-chlorophenylsulfonyl)-phenyl-SO$_2$CH$_2$CH$_3$ | 4-N(CH$_2$CH$_3$)$_2$-phenyl-NHCO(CH$_2$)$_2$SO$_3$H | red |
| 16 | 4-amino-phenyl-SO$_2$CH$_2$CH$_3$ | 4-N(CH$_2$CH$_3$)$_2$-phenyl-NHCOCH$_2$SO$_3$H | yellowish red |
| 17 | 4-amino-3-chloro-phenyl-SO$_2$CH$_3$ | 4-N(CH$_2$CH$_3$)$_2$-phenyl-NHCOCH$_2$SO$_3$H | red |
| 18 | 4-amino-3,5-dichloro-phenyl-SO$_2$NH$_2$ | 4-N(CH$_2$CH$_3$)$_2$-phenyl-NHCOCH$_2$SO$_3$H | red |
| 19 | 4-amino-phenyl-N=N-phenyl | 4-N(CH$_2$CH$_3$)$_2$-phenyl-NHCOCH$_2$SO$_3$H | red |
| 20 | 4-amino-2,6-dimethoxyphenyl-SO$_2$NH-phenyl | 4-N(CH$_2$CH$_3$)$_2$-phenyl-NHCOCH$_2$SO$_3$H | red |
| 21 | 4-amino-2-(4-chlorophenylsulfonyl)-phenyl-SO$_2$CH$_2$CH$_3$ | 4-N(CH$_2$CH$_3$)$_2$-phenyl-NHCOCH$_2$SO$_3$H | red |

TABLE 2-continued

| Example | Amine | Coupling Component | Shade on polyamide |
|---|---|---|---|
| 22 | 4-amino-N-methyl-N-phenyl-benzenesulfonamide | 2-methoxy-5-(sulfoacetylamino)-N-benzyl-N-ethyl-aniline | orange |
| 23 | 4-amino-benzotrifluoride | 2-methoxy-5-(sulfoacetylamino)-N-benzyl-N-ethyl-aniline | orange |
| 24 | 4-amino-2,5-dichloro-N,N-dimethyl-benzenesulfonamide | 2-methoxy-5-(sulfoacetylamino)-N-benzyl-N-ethyl-aniline | bluish red |
| 25 | 4-amino-diphenylsulfone | 2-methoxy-5-(sulfoacetylamino)-N-benzyl-N-ethyl-aniline | yellowish red |
| 26 | 4-amino-phenyl 4-chlorophenyl sulfonate | 2-methoxy-5-(sulfoacetylamino)-N-benzyl-N-ethyl-aniline | yellowish red |
| 27 | 4-amino-2,5-dichloro-benzenesulfonamide | 2-methoxy-5-(sulfoacetylamino)-N-benzyl-N-ethyl-aniline | bluish red |
| 28 | 4-chloro-2-methoxyaniline | 2-methoxy-5-(sulfoacetylamino)-N-benzyl-N-ethyl-aniline | orange |
| 29 | 2,4,5-trichloroaniline | 2-methoxy-5-(sulfoacetylamino)-N-benzyl-N-ethyl-aniline | yellowish red |

TABLE 2-continued

| Example | Amine | Coupling Component | Shade on polyamide |
|---|---|---|---|
| 30 | H₂N–C₆H₄–SO₂CH₂CH₃ | 2-OCH₃-5-NHCOCH₂SO₃H-C₆H₃–N(CH₂C₆H₅)(CH₂CH₃) | yellowish red |
| 31 | H₂N-substituted dibenzodioxin with two CH₃ groups | 2-OCH₃-5-NHCOCH₂SO₃H-C₆H₃–N(CH₂C₆H₅)(CH₂CH₃) | orange |
| 32 | H₂N–C₆H₄–SO₂–C₆H₄–CH₃ | 2-OCH₃-5-NHCOCH₂SO₃H-C₆H₃–N(CH₂C₆H₅)(CH₂CH₃) | yellowish red |
| 33 | H₂N–C₆H₃(SO₂NH₂)(SO₂–C₆H₄–CH₃) | 2-OCH₃-5-NHCOCH₂SO₃H-C₆H₃–N(CH₂C₆H₅)(CH₂CH₃) | red |
| 34 | 2-amino-5-sulfamoylnaphthalene | 4-N(CH₂CH₃)₂-3-NHCOCH₂SO₃H-C₆H₃ | orange |
| 35 | 2-amino-6-sulfamoylnaphthalene | 4-N(CH₂CH₃)₂-3-NHCO(CH₂)₂SO₃H-C₆H₃ | orange |
| 36 | 2-amino-6-sulfamoylnaphthalene | 2-OCH₃-5-NHCOCH₂SO₃H-C₆H₃–N(CH₂C₆H₅)(CH₂CH₃) | yellowish red |

EXAMPLE 37

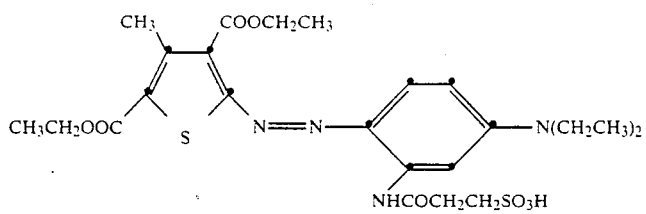
(111)

19 parts of glacial acetic acid and 9 parts of 32% hydrochloric acid are initially taken at 10°, with stirring. 1.98 parts of 2-amino-3,5-dicarboethoxy-4-methylthiophene are then introduced, and the mixture is cooled to 0°. Diazotization is then carried out at 0° to 2° by means of 0.55 part of NaNO$_2$ in 3 parts of water and stirring is continued for 15 minutes. The excess of nitrite is destroyed by means of 1 part of sulfamic acid, and 8.9 parts of N-$\beta$-sulfopropionylamido-3-N,N-diethylaminobenzene are sprinkled in in the course of approx. 1 minute. 16 parts of sodium acetate are then added in 4 portions in the course of 15 minutes and stirring is continued at 0° to 2° for a further 30 minutes. A solution consisting of 4 parts of sodium acetate, 2 parts of sodium carbonate and 20 parts of water is then added dropwise in the course of a further 30 minutes. The dye is filtered off at room temperature, rinsed with 50 parts of 10% aqueous NaCl solution and dried at 50° in a vacuum cabinet. This gives 3.5 parts of a dark powder which dyes synthetic polyamide in violet shades. In the form of the free acid, the dye has the formula (111).

If the procedure described is repeated, but using an equimolar amount of one of the amines indicated in column 2 of Table 3 below as the diazo component, and using one of the coupling components indicated in the form of free acids in column 3 in Table 3 below as the coupling component, dyes which dye synthetic polyamide in the shade indicated in column 4 of Table 3 below are obtained.

TABLE 3

| Example | Amine | Coupling component | Shade on polyamide |
|---|---|---|---|
| 38 | H$_3$C, COOCH$_3$, H$_3$COOC, S, NH$_2$ (thiophene) | N(CH$_2$CH$_3$)$_2$ / NHCOCH$_2$SO$_3$H (benzene) | violet |
| 39 | H$_3$C, COOCH$_3$, H$_3$COOC, S, NH$_2$ (thiophene) | N(CH$_2$CH$_3$)$_2$ / NHCOCH$_2$CH$_2$SO$_3$H (benzene) | violet |
| 40 | CH$_3$, COOCH$_2$CH$_3$, H$_3$CH$_2$COOC, S, NH$_2$ (thiophene) | N(CH$_2$CH$_3$)$_2$ / NHCOCH$_2$SO$_3$H (benzene) | violet |
| 41 | benzothiazole—N=, COOCH$_2$CH$_3$, S, NH$_2$ (thiophene) | N(CH$_2$CH$_3$)$_2$ / NHCOCH$_2$SO$_3$H (benzene) | reddish blue |
| 42 | benzothiazole—N=, COOCH$_2$CH$_3$, S, NH$_2$ (thiophene) | N(CH$_2$CH$_3$)$_2$ / NHCOCH$_2$CH$_2$SO$_3$H (benzene) | reddish blue |
| 43 | benzoxazole—N=, COOCH$_2$CH$_3$, S, NH$_2$ (thiophene) | N(CH$_2$CH$_3$)$_2$ / NHCOCH$_2$SO$_3$H (benzene) | reddish blue |

TABLE 3-continued

| Example | Amine | Coupling component | Shade on polyamide |
|---|---|---|---|
| 44 | benzoxazole-methyl-thiophene with COOCH₂CH₃ and NH₂ substituents | 4-N(CH₂CH₃)₂, NHCOCH₂CH₂SO₃H phenyl | reddish blue |
| 45 | (CH₃)₂HCC(O)-methylthiophene with COOCH₃ and NH₂ | 4-N(CH₂CH₃)₂, NHCOCH₂SO₃H phenyl | reddish blue |
| 46 | (CH₃)₂HCC(O)-methylthiophene with COOCH₃ and NH₂ | 4-N(CH₂CH₃)₂, NHCOCH₂CH₂SO₃H phenyl | reddish blue |
| 47 | PhC(O)-methylthiophene with COOCH₃ and NH₂ | 4-N(CH₂CH₃)₂, NHCOCH₂SO₃H phenyl | reddish blue |
| 48 | PhC(O)-methylthiophene with COOCH₃ and NH₂ | 4-N(CH₂CH₃)₂, NHCOCH₂CH₂SO₃H phenyl | reddish blue |
| 49 | 4,6-dimethyl-5-oxo-cyclohexenothiophene with COOCH₃ and NH₂ | 4-N(CH₂CH₃)₂, NHCOCH₂SO₃H phenyl | reddish blue |
| 50 | 4,6-dimethyl-5-oxo-cyclohexenothiophene with COOCH₃ and NH₂ | 4-N(CH₂CH₃)₂, NHCOCH₂CH₂SO₃H phenyl | reddish blue |
| 51 | (CH₃)₂HCC(O)-methylthiophene with COOCH₃ and NH₂ | 2-OCH₃, 5-NHCOCH₂SO₃H, N(CH₂C₆H₅)(CH₂CH₃) phenyl | blue |

TABLE 3-continued

| Example | Amine | Coupling component | Shade on polyamide |
|---|---|---|---|
| 52 | 2-amino-3-methoxycarbonyl-5-methyl-6-oxo-4,5,6,7-tetrahydrobenzo[b]thiophene (H₃C, COOCH₃, S, NH₂, O) | 4-(N-benzyl-N-ethyl)amino-2-methoxy-N-(sulfoacetyl)aniline (OCH₃, CH₂-Ph, N, CH₂CH₃, NHCOCH₂SO₃H) | blue |
| 53 | 2-amino-3-methoxycarbonyl-6-oxo-4,5,6,7-tetrahydrobenzo[b]thiophene (COOCH₃, S, NH₂, O) | same as above | blue |
| 54 | 2-amino-3-methoxycarbonyl-5-benzoyl-thiophene (H, C=O, S, NH₂, COOCH₃) | same as above | blue |
| 55 | 2-amino-3-methoxycarbonyl-5-(4-methylbenzoyl)-thiophene (H₃C-Ph-C(O)-, S, NH₂, COOCH₃) | same as above | blue |
| 56 | 2-amino-3-cyano-5,5-dimethyl-7-methyl-6-oxo-4,5,6,7-tetrahydrobenzo[b]thiophene (H₃C, H₃C, CN, S, NH₂, O) | same as above | greenish blue |
| 57 | 2-amino-3-ethoxycarbonyl-5-(benzothiazol-2-yl)-thiophene (COOCH₂CH₃, S, NH₂) | same as above | blue |
| 58 | 2-amino-3-ethoxycarbonyl-5-(benzoxazol-2-yl)-thiophene (COOCH₂CH₃, S, NH₂) | same as above | blue |
| 59 | 2-amino-3-cyano-5-(benzothiazol-2-yl)-thiophene (CN, S, NH₂) | same as above | greenish blue |

TABLE 3-continued

| Example | Amine | Coupling component | Shade on polyamide |
|---|---|---|---|
| 60 | benzisothiazole with NH₂ | 2-OCH₃, 4-NHCOCH₂SO₃H phenyl with N(CH₂C₆H₅)(CH₂CH₃) | blue |
| 61 | 5-chloro benzisothiazole with NH₂ | 2-OCH₃, 4-NHCOCH₂SO₃H phenyl with N(CH₂C₆H₅)(CH₂CH₃) | blue |
| 62 | CH₃CH₂S–C(=N–N=)–C(NH₂)=(S) thiadiazole | 4-NHCOCH₂SO₃H phenyl with N(CH₂CH₃)₂ | red |
| 63 | CH₃(CH₂)₅S–C(=N–N=)–C(NH₂)=(S) thiadiazole | 4-NHCOCH₂SO₃H phenyl with N(CH₂CH₃)₂ | red |
| 64 | benzisothiazole with NH₂ | 4-NHCOCH₂SO₃H phenyl with N(CH₂CH₃)₂ | red |
| 65 | 5-Cl benzisothiazole with NH₂ | 4-NHCOCH₂SO₃H phenyl with N(CH₂CH₃)₂ | ruby |
| 66 | 5-H₃CO benzisothiazole with NH₂ | 4-NHCOCH₂SO₃H phenyl with N(CH₂CH₃)₂ | bluish red |
| 67 | 5-H₃C benzisothiazole with NH₂ | 4-NHCOCH₂SO₃H phenyl with N(CH₂CH₃)₂ | red |
| 68 | 4-Cl benzisothiazole with NH₂ | 4-NHCOCH₂SO₃H phenyl with N(CH₂CH₃)₂ | ruby |

TABLE 3-continued

| Example | Amine | Coupling component | Shade on polyamide |
|---|---|---|---|
| 69 | 2-methylphenyl-C(=N)(NH₂) via S (benzothiazole-like with CH₃) | N,N-diethyl-3-(NHCOCH₂SO₃H)aniline | red |
| 70 | 4-(H₃CO₂S)-benzothiazole-2-amidine | N,N-diethyl-3-(NHCOCH₂SO₃H)aniline | red |
| 71 | 4-(H₃CS)-benzothiazole-2-amidine | N,N-diethyl-3-(NHCOCH₂SO₃H)aniline | red |
| 72 | 2-(benzothiazol-2-yl)-3-amino-4-cyanothiophene imine | N,N-diethyl-3-(NHCOCH₂CH₂SO₃H)aniline | blue |
| 73 | 2-amino-3-methoxycarbonyl-5-(4-methylbenzoyl)thiophene | N,N-diethyl-3-(NHCOCH₂SO₃H)aniline | intense reddish blue |
| 74 | 2-amino-3-methoxycarbonyl-5-(4-methylbenzoyl)thiophene | N,N-diethyl-3-(NHCOCH₂CH₂SO₃H)aniline | intense reddish blue |
| 75 | 2-amino-3-methoxycarbonyl-benzo[b]thiophene | N,N-diethyl-3-(NHCOCH₂SO₃H)aniline | yellowish red |
| 76 | 7-chloro-2-amino-3-methoxycarbonyl-benzo[b]thiophene | N,N-diethyl-3-(NHCOCH₂SO₃H)aniline | orange |

TABLE 3-continued

| Example | Amine | Coupling component | Shade on polyamide |
|---|---|---|---|
| 77 | benzo[b]thiophene with COOCH₃, CH₃, NH₂ substituents | N,N-diethylaniline with NHCOCH₂SO₃H | bluish red |
| 78 | thiophene with H₃C, COOCH₃, CH₃OC(O), NH₂ substituents | N,N-diethylaniline with NHCOCH₂SO₃H | violet |
| 79 | benzo[b]thiophene with NH₂, COOCH₃ substituents | N,N-diethylaniline with NHCOCH₂CH₂SO₃H | yellowish red |
| 80 | benzo[b]thiophene with Cl, NH₂, COOCH₃ substituents | N,N-diethylaniline with NHCOCH₂CH₂SO₃H | orange |
| 81 | benzo[b]thiophene with COOCH₃, NH₂ substituents | N,N-diethylaniline with NHCOCH₂CH₂SO₃H | bluish red |
| 82 | thiophene with H₃C, COOCH₃, CH₃OC(O), NH₂ substituents | N,N-diethylaniline with NHCOCH₂CH₂SO₃H | violet |
| 83 | benzo[b]thiophene with NH₂, COOCH₃ substituents | aniline with OCH₃, N(CH₂Ph)(CH₂CH₃), NHCOCH₂SO₃H | yellowish red |

TABLE 3-continued

| Example | Amine | Coupling component | Shade on polyamide |
|---|---|---|---|
| 84 | benzo[b]thiophene with COOCH₃ and NH₂ substituents | 2-OCH₃, N(CH₂C₆H₅)(CH₂CH₃), 5-NHCOCH₂SO₃H benzene | intense bluish red |
| 85 | 7-Cl benzo[b]thiophene with NH₂ and COOCH₃ substituents | 2-OCH₃, N(CH₂C₆H₅)(CH₂CH₃), 5-NHCOCH₂SO₃H benzene | yellowish red |
| 86 | thiophene with H₃C, COOCH₃, CH₃OOC, NH₂ substituents | 2-OCH₃, N(CH₂C₆H₅)(CH₂CH₃), 5-NHCOCH₂SO₃H benzene | violet |
| 87 | CH₃CH₂S—C(=N-N=)—S—C(NH₂) (1,3,4-thiadiazole) | N,N-diethyl, NHCO(CH₂)₂SO₃H benzene | red |
| 88 | CH₃(CH₂)₅S—C(=N-N=)—S—C(NH₂) (1,3,4-thiadiazole) | N,N-diethyl, NHCO(CH₂)₂SO₃H benzene | red |
| 89 | benzothiazole-2-NH₂ | N,N-diethyl, NHCO(CH₂)₂SO₃H benzene | red |

TABLE 3-continued
| Example | Amine | Coupling component | Shade on polyamide |
|---|---|---|---|
| 90 | 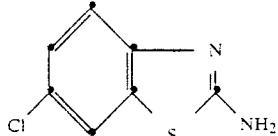 | 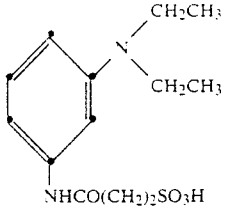 | ruby |
| 91 | 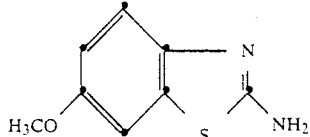 | 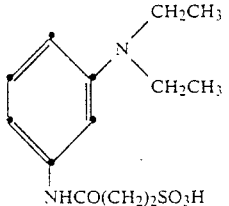 | bluish red |
| 92 | 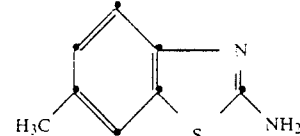 | 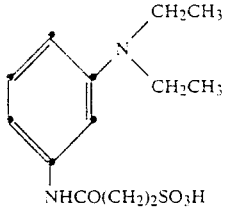 | red |
| 93 | 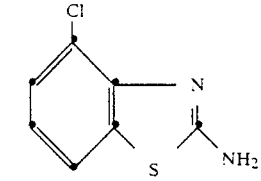 | 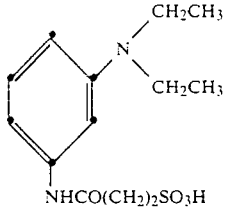 | ruby |
| 94 | 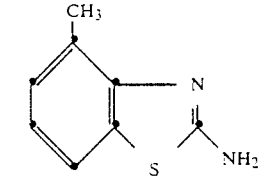 | 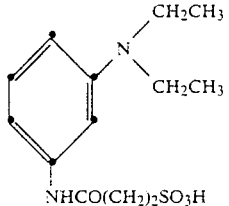 | red |
| 95 | 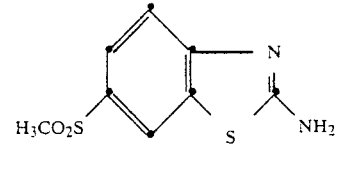 | 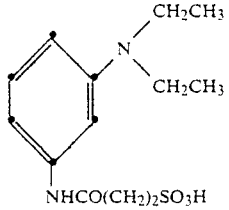 | red |
| 96 | 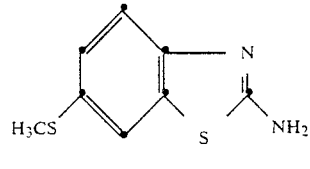 | 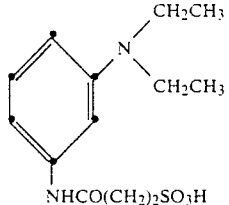 | red |

Dyeing instructions I 10 parts of polyamide-6.6 fibre material (Helanca tricot) are dyed in 500 parts of an aqueous liquor which contains 2 g/l of ammonium acetate and is adjusted to pH 5 with acetic acid. The proportion of dye according to Example 6 is 0.7%, relative to the weight of fibre. The dyeing time is 30 to 90 minutes at a temperature of 98°. The dyed fibre material is then taken out and rinsed and dried in a customary manner.

An orange-coloured polyamide-6.6 fibre material having a clear shade and good all-round fastness properties is obtained.

Dyeing instructions II 10 parts of polyamide-6.6 fibre material (Helanca tricot) are dyed in 500 parts of an aqueous liquor which contains 1 g/l of monosodium phosphate and is adjusted to pH 6 with disodium phosphate. The proportion of dye according to Example 40 is 1%, relative to the weight of fibre. The dyeing time is 30 to 90 minutes at a temperature of 98°. The dyed fibre material is then taken out and rinsed and dried in a customary manner.

A violet-coloured polyamide-6.6 fibre material having a clear shade and good all-round fastness properties is obtained.

Dyeing instructions III 10 parts of a woollen article are dyed in 500 parts of an aqueous liquor. Relative to the weight of fibre, the proportion of dye according to Example 39 is 0.45%, that of calcined sodium sulfate is 5% and that of 80% acetic acid is 2%. The dyeing time is 30–60 minutes at a temperature of 98°. After rinsing and drying in a customary manner, the violet-coloured woollen article has very good overall fastness properties.

What is claimed is:

1. An azo of the formula

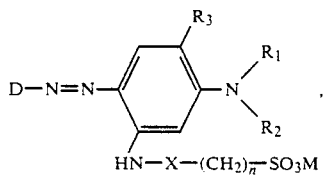

(1)

in which

D is thienyl, thiazolyl, 7-oxotetrahydrobenzo[b]thiophenyl, isothiazolyl, 1,2,4-thiadiazolyl, 1,3,4-thiadiazolyl, benzthiazolyl, benzisothiazolyl, pyrazolyl, imidazolyl, 1,2,3-triazolyl, 1,2,4-triazolyl, thiophenyl, benzthiophenyl, tetrahydrobenzo[b]thiophenyl, pyridinyl, indazolyl, phenyl or naphthyl, each of which is unsubstituted or substituted by $C_1$-$C_8$alkyl, $C_1$-$C_8$alkoxy, $C_2$-$C_8$alkanoyl, $C_2$-$C_8$alkanoylamino, $C_2$-$C_8$alkoxycarbonylamino, $C_5$-$C_7$cycloalkylcarbonyl, benzoyl which is unsubstituted or substituted by $C_1$-$C_4$alkyl or halogen, amino, monoalkylamino or dialkylamino, each of which has 1 to 8 carbon atoms in the alkyl radical, phenylamino, $C_1$-$C_8$alkoxycarbonyl, $C_3$-$C_7$cycloalkylaminosulfonyl, nitro, cyano, trifluoromethyl, halogen, sulfamoyl, sulfamoyl which is monosubstituted or disubstituted on the nitrogen atom by $C_1$-$C_4$alkyl, $C_5$-$C_7$cycloalkyl or phenyl, carbamoyl, ureido, hydroxyl, $C_1$-$C_8$alkylsulfonyl, $C_1$-$C_8$alkylaminosulfonyl, phenylsulfonyl or phenoxysulfonyl each of which is unsubstituted or substituted by $C_1$-$C_4$alkyl, halogen or sulfo, carboxyl, sulfomethyl, sulfo, sulfato, thiosulfato or $C_1$-$C_8$alkylthio, benzisothiazolyl, benzthiazolyl, benzisooxazolyl or benzoxazolyl, each of which is unsubstituted or substituted by $C_1$-$C_4$alkyl or halogen, phenylazo, naphthylazo, or phenoxy or phenylaminosulfonyl both of which are unsubstituted or substituted by $C_1$-$C_4$alkyl or halogen, or phenyl or naphthyl, $R_1$ and $R_2$ independently of one another are each $C_1$-$C_{10}$alkyl which is unsubstituted or substituted by hydroxyl, $C_1$-$C_4$alkoxy, phenyl, sulfo, sulfato, thiosulfato, cyano or halogen, $C_5$-$C_7$cycloalkyl which is unsubstituted or substituted by halogen, $C_1$-$C_4$alkyl or $C_1$-$C_4$alkoxy, or phenyl or naphthyl which both are unsubstituted or substituted by $C_1$-$C_4$alkyl, $C_1$-$C_4$alkoxy, $C_2$-$C_4$alkanoylamino, benzoylamino, halogen or sulfo, or the radical

is piperazinyl, piperidinyl or morpholinyl, $R_3$ is hydrogen, halogen, $C_1$-$C_{10}$alkyl which is unsubstituted or substituted by hydroxyl, $C_1$-$C_4$alkoxy, phenyl, sulfo, sulfato, thiosulfato, cyano or halogen, $C_1$-$C_{10}$alkoxy which is unsubstituted or substituted by $C_1$-$C_4$alkoxy, or phenoxy which is unsubstituted or substituted by $C_1$-$C_4$alkoxy, $C_2$-$C_4$alkanoylamino, benzoylamino, halogen or sulfo, X is —CO— or —$SO_2$—, n is the number 1,2,3,4,5 or 6 and M is a cation.

2. An azo dye according to claim 1, wherein the dye of the formula (1) contains only one single sulfonic acid group.

3. An azo dye according to claim 1, wherein $R_1$ and $R_2$ independently of one another are $C_1$-$C_4$alkyl or benzyl.

4. An azo dye according to claim 1, wherein $R_3$ is hydrogen, $C_1$-$C_4$alkyl, $C_1$-$C_4$alkoxy or chlorine.

5. An azo dye according to claim 1, wherein X is —CO—.

6. An azo dye according to claim 1, wherein n is the number 1 or 2.

7. An azo dye according to claim 1 of the formula

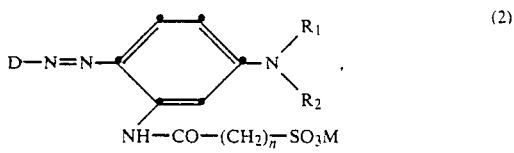

(2)

in which D is phenyl which is substituted by N-methyl-N-cyclohexylsulfamoyl, N-ethyl-N-phenylsulfamoyl, N-methyl-N-cycloheptylsulfamoyl, 2'-chlorophenoxysulfonyl, chlorine, sulfamoyl, methoxy, N-phenylsulfamoyl, N,N-dimethylsulfamoyl, phenylsulfonyl, p-methylphenylsulfonyl, p-chlorophenylsulfonyl, o-methylphenoxy, phenoxy, phenylazo, methylsulfonyl, ethylsulfonyl or trifluoromethyl, 3,5-diethoxycarbonyl-4-methylthiophenyl, 3-methoxycarbonyl-5-isobutyrylthiophenyl, 3-methoxycarbonyl-5-cyclohexylcarbonylthiophenyl, 3-methoxycarbonyl-5-(4'-methylbenzoyl)-thiophenyl, 3-ethoxycarbonyl-5-(benzthiazol-2'-yl)thiophenyl, 3-ethoxycarbonyl-5-(benzoxazol-2'-yl)thiophenyl, 3-cyano-5-(benzthiazol-2'-yl)thiophenyl, 3,5-dimethoxycarbonyl-4-methylthiophenyl, 7-oxo-3-methoxycarbonyl-4,5,6,7-tetrahydrobenzo[b]thiophenyl, 7-oxo-3-methoxy-6-methyl-4,5,6,7-tetrahydrobenzo[b]thiophenyl, 7-oxo-3-cyano-5,5-dimethyl-4,5,6,7-tetrahydrobenzo[b]thiophenyl, 2-methoxycarbonyl-4,5,6,7-tetrahydrobenzo[b]thiophenyl, 3-methoxycarbonyl-4,5,6,7-tetrahydrobenzo[b]thiophenyl, 2-methoxycarbonyl-4-chlorobenzo[b]thiophenyl, 3-methoxycarbonylbenzo[b]thiophenyl, benzthiazolyl, 6-chlorobenzthiazolyl, 6-methoxybenzthiazolyl, 6-methylbenzthiazolyl, 4-chlorobenzthiazolyl, 4-methylbenzthiazolyl, 6-methylsulfonylbenzthiazolyl, 6-methylthiobenzthiazolyl, benzisothiazolyl, 5-chlorobenzisothiazolyl, 5-ethylthio-1,3,4-thiadiazolyl, 5-hexylthio-1,3,4-thiadiazolyl or 5-sulfamoylnaphthyl, $R_1$ is ethyl and $R_2$ is ethyl or benzyl, n is the number 1 or 2 and M is hydrogen, an alkali metal cation, ammonium or $C_1$-$C_4$alkylammonium.

* * * * *